(12) United States Patent
McCunn et al.

(10) Patent No.: US 7,441,643 B2
(45) Date of Patent: Oct. 28, 2008

(54) TRANSMISSION HAVING A BACKUP LATCH MECHANISM

(75) Inventors: Bradley K. McCunn, Eureka, IL (US);
Kevin G. Meyer, Metamora, IL (US);
James W. Landes, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 338 days.

(21) Appl. No.: 11/311,304

(22) Filed: Dec. 20, 2005

(65) Prior Publication Data

US 2007/0137973 A1    Jun. 21, 2007

(51) Int. Cl.
F16D 19/00  (2006.01)
F16D 21/08  (2006.01)
F16D 25/00  (2006.01)

(52) U.S. Cl. .................... 192/87.13; 192/87.18
(58) Field of Classification Search ............... 192/3.58, 192/85 R, 87.13, 87.18
See application file for complete search history.

(56) References Cited

U.S. PATENT DOCUMENTS

| 3,937,108 A | 2/1976 | Will |
| 4,345,489 A | 8/1982 | Müller et al. |
| 4,628,772 A | 12/1986 | Nishikawa et al. |
| 4,887,491 A | 12/1989 | Holbrook et al. |
| 4,995,285 A | 2/1991 | Hayakawa et al. |
| 5,591,096 A | 1/1997 | Wagner et al. |
| 5,682,791 A | 11/1997 | Liesener |
| 5,682,792 A * | 11/1997 | Liesener et al. ............... 74/335 |
| 6,223,113 B1 | 4/2001 | McCunn et al. |
| 6,865,965 B2 | 3/2005 | Uchino |
| 6,929,584 B2 | 8/2005 | Miyata et al. |
| 6,948,395 B2 | 9/2005 | Gierer et al. |

FOREIGN PATENT DOCUMENTS

| JP | 59113350 | 6/1984 |
| JP | 63243556 | 10/1988 |

* cited by examiner

*Primary Examiner*—Tisha D Lewis
(74) *Attorney, Agent, or Firm*—Finnegan, Henderson, Farabow, Garrett & Dunner

(57) ABSTRACT

A transmission has a source of pressurized fluid, a low-pressure reservoir, a plurality of hydraulically actuated clutches, a first plurality of valve mechanisms, and a second plurality of valve mechanisms. Each of the first plurality of valve mechanisms is associated with one of the plurality of hydraulically actuated clutches and configured to selectively fill and drain the associated one of the plurality of hydraulically actuated clutches. Each of the second plurality of valve mechanisms is associated with one of the plurality of hydraulically actuated clutches and configured to selectively fill and drain the associated one of the plurality of hydraulically actuated clutches. The transmission also includes a master latch mechanism in fluid communication with only the second plurality of valve mechanisms. The master latch mechanism is configured to selectively affect movement of the second plurality of valve mechanisms in response to an electrical power failure.

22 Claims, 3 Drawing Sheets

| FAILURE STRATEGY ||
| START GEAR/ (CLUTCH ENGAGEMENT) | FAIL TO GEAR/ (CLUTCH ENGAGEMENT) |
| --- | --- |
| R (26,30) | N |
| N | N |
| 1 (22,30) | 3 (22,26) |
| 2 (22,28) | 3 (22,26) |
| 3 (22,26) | 3 (22,26) |
| 4 (22,24) | 4 (22,24) |
| 5 (24,26) | 5 (24,26) |
| 6 (24,28) | 5 (24,26) |

*FIG. 3*

TRANSMISSION HAVING A BACKUP LATCH MECHANISM

TECHNICAL FIELD

The present disclosure relates generally to a transmission and, more particularly, to a transmission having a backup latch mechanism.

BACKGROUND

Work machines such as, for example, on or off-highway haul or vocational trucks, construction equipment, and other work machines known in the art often include a multi-speed bidirectional transmission that has one or more hydraulically actuated friction clutches. These clutches may be selectively filled with pressurized fluid to produce predetermined output ratios of the transmission in either forward or reverse directions. The filling of the friction clutches may be controlled by electro-hydraulic proportional valve elements. That is, in response to an applied current the valve element moves to connect a source of pressurized fluid with the clutch to fill and thereby engage the clutch. As current is removed from the valve element, the fluid is drained from the clutch to disengage the clutch.

During operation of the work machine, it is possible for the transmission to lose electrical power. This loss of power typically results in draining of the friction clutches and loss of functionality of the work machine. Without intervention, the work machine could be inconveniently stranded away from service and repair resources. In addition, if the loss of electrical power occurs during an engine retarding operation, the ability to slow the work machine could be adversely affected.

One method of maintaining functionality of a transmission during an electrical power failure is described in U.S. Pat. No. 5,682,791 (the '791 patent) issued to Liesener on Nov. 4, 1997. The '791 patent describes a transmission having an independent latching system. Specifically, the transmission of the '791 patent includes a plurality of electro-hydraulic valve mechanisms. Each of the electro-hydraulic valve mechanisms includes a proportional valve element connected between a hydraulically actuated clutch, a source of pressurized fluid, and a low pressure reservoir to selectively fill and engage or drain and disengage the clutch. Each of the electro-hydraulic valve mechanisms also includes a latching shuttle valve disposed between the associated proportional valve element and the low pressure reservoir. A first end of the latching shuttle valve is in communication with the associated clutch.

The transmission of the '791 patent also includes a master latch valve connected between the source, the reservoir, and a second opposed end of each latching shuttle valve. In response to an electrical power failure, the master latch valve is spring biased to connect the reservoir with the second end of the latching shuttle valves. In this situation, the force generated by the pressurized fluid in the actuated ones of the hydraulically actuated clutches acting on the first end of the latching shuttle valves quickly moves the respective latching shuttle valves to block fluid from draining from the clutches to the reservoir.

Although the latching system of the '791 patent may sufficiently maintain functionality of the transmission during an electrical power failure, it may be expensive and difficult to package. In particular, because each of the electro-hydraulic valve mechanisms includes a latching shuttle valve, the cost of the '791 system may be high. In addition, the numerous valve elements of the '791 system may be difficult to package within an existing transmission or within the undercarriage space of a vehicle.

The disclosed transmission is directed to overcoming one or more of the problems set forth above.

SUMMARY OF THE INVENTION

In one aspect, the present disclosure is directed to a transmission that includes a source of pressurized fluid, a low pressure reservoir, a plurality of hydraulically actuated clutches, a first plurality of valve mechanisms, and a second plurality of valve mechanisms. Each of the first plurality of valve mechanisms is associated with one of the plurality of hydraulically actuated clutches and configured to selectively fill and drain the associated one of the plurality of hydraulically actuated clutches. Each of the second plurality of valve mechanisms is associated with one of the plurality of hydraulically actuated clutches and configured to selectively fill and drain the associated one of the plurality of hydraulically actuated clutches. The transmission also includes a master latch mechanism in fluid communication with only the second plurality of valve mechanisms. The master latch mechanism is configured to selectively affect movement of the second plurality of valve mechanisms in response to an electrical power failure.

In yet another aspect, the present disclosure is directed to a method of operating a transmission. The method includes pressurizing a fluid and selectively directing the pressurized fluid to and draining fluid from a first plurality of hydraulically actuated clutches via a first plurality of valve mechanisms. The method also includes selectively directing the pressurized fluid to and draining fluid from a second plurality of hydraulically actuated clutches via a second plurality of valve mechanisms. The method further includes selectively affecting movement of only the second plurality of valve mechanisms in response to an electrical power failure.

BRIEF DESCRIPTION OF THE DRAWINGS

FIG. 3 is a table illustrating exemplary clutch combinations associated with the schematic of FIG. 2.

DETAILED DESCRIPTION

Figure 1:
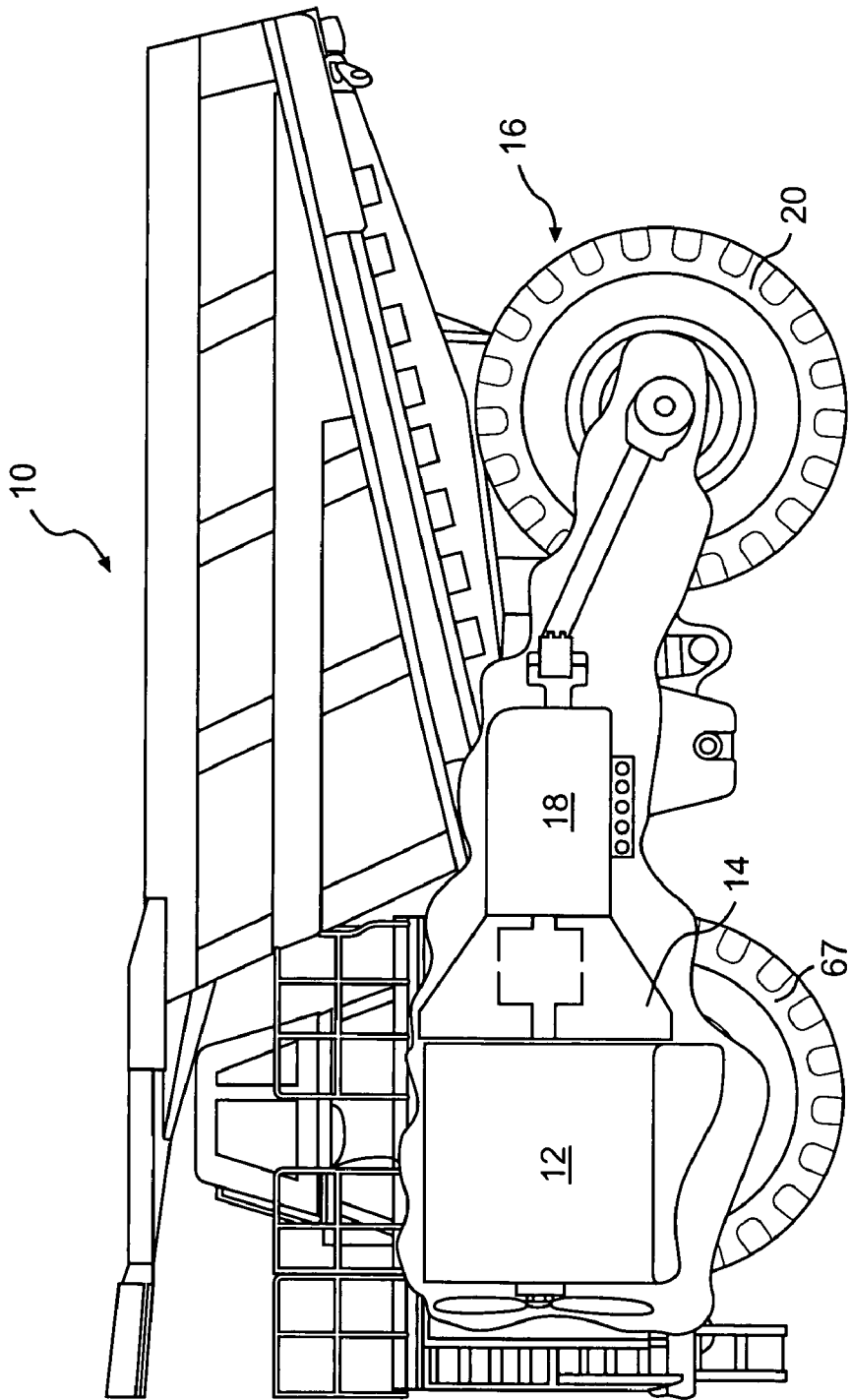
FIG. 1 is a diagrammatic illustration of a work machine having an exemplary disclosed transmission.

FIG. 1 illustrates an exemplary work machine 10. Work machine 10 may embody a mobile machine that performs some type of operation associated with an industry such as mining, construction, farming, transportation, or any other industry known in the art. For example, work machine 10 may be an earth moving machine such as an off-highway haul truck, a loader, a motor grader, or any other earth moving machine. Work machine 10 may alternatively embody an on-highway vocational truck or passenger vehicle, or any other suitable operation-performing work machine. Work machine 10 may include a power source 12, a torque converter 14, a traction device 16, and a transmission 18 operatively connected between the torque converter 14 and traction device 16.

Power source 12 may be configured to produce a power output and may include an internal combustion engine such as, for example, a heavy fuel engine, a diesel engine, a gasoline engine, a gaseous fuel-powered engine, or any other apparent type of engine. It is contemplated that power source 12 may alternatively include another source of power such as a battery, a fuel cell, or any other source of power known in the art.

Torque converter 14 may be a hydro-mechanical device configured to couple power source 12 to transmission 18. In particular, torque converter 14 may conduct pressurized fluid between the output of power source 12 and the input of transmission 18 to thereby drive transmission 18, while still allowing power source 12 to rotate somewhat independently of transmission 18. In this arrangement, torque converter 14 may selectively absorb and multiply the torque transferred between power source 12 and transmission 18 by either allowing or preventing slippage between the output rotation of power source 12 and the input rotation of transmission 18. It is contemplated that torque converter 14 may alternatively embody a non-hydraulic device such as, for example, a mechanical diaphragm clutch.

Traction device 16 may include wheels 20 located to each side of work machine 10 (only one side shown). Alternatively, traction device 16 may include tracks, belts or other driven traction devices. Wheels 20 may be driven by transmission 18 to rotate in accordance with an output rotation of transmission 18.

Figure 2:
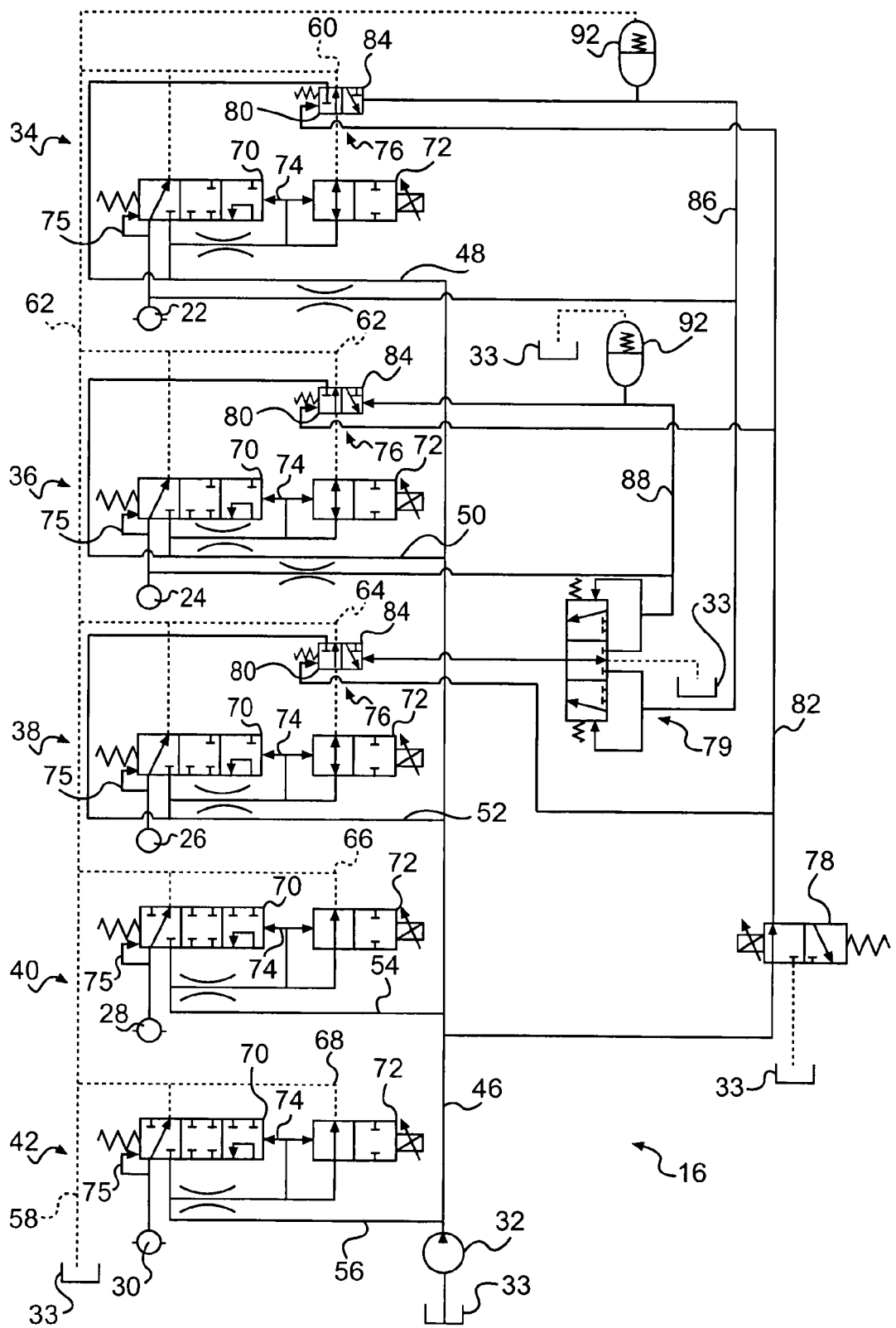
FIG. 2 is a schematic illustration of an exemplary disclosed hydraulic circuit for the transmission of FIG. 1.

As illustrated in FIG. 2, transmission 18 may include numerous components that interact to transmit power from power source 12 and torque converter 14 to traction device 16. In particular, transmission 18 may embody a multi-speed bidirectional mechanical transmission having a plurality of fluid activated clutches and control valves. In one embodiment, transmission 18 includes five clutches 22, 24, 26, 28, 30 selectively fluidly connected to a source 32 of pressurized fluid and to a tank 33 through five control valves 34, 36, 38, 40, 42. It is contemplated that additional or fewer clutches and/or control valves may be included within transmission 18 than what is depicted in FIG. 2. It is also contemplated that transmission 18 may include additional or different components than those depicted within FIG. 2 such as, for example, a pressure relief valve, one or more check valves, a controller, and other similar transmission components known in the art.

Clutches 22-30 may be configured to selectively receive pressurized fluid from source 32 causing engagement of portions of a gear train (not shown) within transmission 18. Specifically, each of clutches 22-30 may be fluidly connected to source 32 in parallel relation by way of a supply manifold 46 and distribution lines 48, 50, 52, 54, and 56, and by way of a drain manifold 58 and drain lines 60, 62, 64, 66, and 68, respectively. Each of clutches 22-30 may include an interior actuating chamber (not shown) that, when filled with pressurized fluid, displaces a piston (not shown) moving the piston toward one or more clutch disks (not shown) and plates (not shown), which, together, are also known as a clutch pack. As the piston "touches up" to the clutch pack, the actuating chamber is full of fluid and the clutch is engaged. The combination of engaged clutches may determine the output speed ratio of transmission 18.

Source 32 may be configured to produce a flow of pressurized fluid and may include a variable displacement pump, a fixed displacement pump, a variable flow pump, or any other source of pressurized fluid known in the art. Source 32 may be drivably connected to power source 12 by, for example, a countershaft (not shown), a belt (not shown), an electrical circuit (not shown), or in any other suitable manner. It is contemplated that source 32 may alternatively be drivably connected to transmission 18. Source 32 may be dedicated to supplying pressurized fluid only to transmission 18 or, alternatively, may supply pressurized fluid to both power source 12 and transmission 18.

Tank 33 may embody a reservoir configured to hold a supply of fluid. The fluid may include, for example, an engine lubrication oil, a transmission lubrication oil, a separate hydraulic oil, or any other fluid known in the art. One or both of power source 12 and transmission 18 may draw fluid from and return fluid to tank 33. It is contemplated that power source 12 and transmission 18 may be connected to multiple separate fluid tanks, if desired.

Control valves 34-42 may be disposed between clutches 22-30 and supply and drain manifolds 46, 58, and configured to regulate a flow of pressurized fluid to and from clutches 22-30. Specifically, each of control valves 34-42 may include a hydraulically actuated proportional valve element 70 and an electrically actuated proportional valve element 72. Valve element 72 may be movable between a first position at which pressurized fluid from the associated distribution line is allowed to bypass the associated clutch and flow directly to tank 33 via the associated drain line and drain manifold 58, and a second position at which the bypass flow of pressurized fluid is prevented. When the bypass flow of pressurized fluid is prevented, pressure may build within a pilot passageway 74 connecting valve elements 70 and 72. Once the pressure within pilot passageway 74 exceeds a predetermined pressure threshold set by a biasing spring of valve element 70 and fluid within a pilot passageway 75, valve element 70 may be urged from a clutch draining position toward a clutch filling position, thereby engaging the respective clutch. To initiate draining of the respective clutch, valve element 72 may be moved to the fluid bypassing position, at which the pressure within pilot passageway 74 may be relieved. As the pressure of the fluid within pilot passageway 74 drops below the predetermined threshold value, valve element 70 may return from the clutch filling position to the clutch draining position, thereby disengaging the respective clutch.

Control valves 34-38 may be dissimilar from control valves 40 and 42. Specifically, control valves 34-38 may each include an additional latching valve element 76 disposed between the associated drain line and valve element 72. Each latching valve element 76 may be selectively hydraulically actuated with and against a spring bias to move between a first position and a second position. When latching valve element 76 is in the first position, pressurized fluid may flow substantially unrestricted from the associated distribution line through valve element 72 to tank 33. However, when latching valve element 76 is in the second position, pressurized fluid may be blocked from flowing through valve element 72 to tank 33.

Transmission 18 may also include a master latch valve 78 and a logic valve 79 in communication with the ends of each latching valve element 76 to affect motion of latching valve elements 76. Specifically, master latch valve 78 may embody a two-position, electrically actuated valve element movable from a first position at which a first end 80 of each latching valve element 76 is communicated with tank 33, against a spring bias to a second position at which pressurized fluid from supply manifold 46 communicates with first end 80 of each latching valve element 76 via a communication line 82. Logic valve 79 may embody a three-position, hydraulically actuated valve element. When in the first position, a second end 84 of the latching valve element 76 of control valve 34 may be communicated with second end 84 of the latching valve element 76 of control valve 38 via a communication line 86. When in the second position, second end 84 of the latching valve element 76 of control valve 36 may be communicated with second end 84 of the latching valve element 76 of control valve 38 via a communication line 88. When in the third position, the second end 84 of the latching valve element 76 of control valve 38 may be connected to tank 33 via a communication line 90. The balance of pressures across the latching valve elements 76 of control valves 34-38, in combination with the force of the associated biasing springs, may affect movement of the respective latching valve elements 76.

Accumulators may be associated with each of control valves 34 and 36. Specifically, an accumulator 92 may be associated with control valve 34 and configured to collect pressurized fluid from and dispel the pressurized fluid to communication line 86. Similarly, an accumulator 94 may be associated with control valve 36 and configured to collect pressurized fluid from and dispel the pressurized fluid to communication line 88

FIG. 3 includes a table illustrating the combination of clutches that must be engaged to produce a particular desired output ratio of transmission 18. That is, in response to an operator selected output of transmission 18, clutches 22-30 may be selectively filled and drained of pressurized fluid to engage the desired gear combinations. For example, clutches 22 and 30 may be filled with pressurized fluid to produce a $1^{st}$ output gear ratio. For $2^{nd}$ gear, clutches 22 and 28 may be filled. For $3^{rd}$ gear, clutches 22 and 26 may be filled. For $4^{th}$ gear, clutches 22 and 24 may be filled. For $5^{th}$ gear, clutches 24 and 26 may be filled. For $6^{th}$ gear, clutches 24 and 28 may be filled. For reverse gear, clutches 26 and 30 may be filled. To achieve a neutral condition of transmission 18, clutch 30 may be drained. It is contemplated that other combinations of clutches may be selected to produce the indicated output ratios of transmission 18, if desired.

In addition, FIG. 3 includes the combination of clutches that may engage in response to an electrical power failure based on a starting output ratio of transmission 18. For example, if transmission 18 is currently in the reverse gear and the electrical power supplied to transmission 18 fails, transmission 18 may automatically shift to the neutral condition. Similarly, if transmission 18 is currently in the neutral condition, it may remain in the neutral condition upon power failure. When in $1^{st}$-$3^{rd}$ gears, transmission 18 may automatically shift to $3^{rd}$ gear. When in $4^{th}$ gear, transmission 18 may remain in $4^{th}$ gear upon power failure. When in $5^{th}$ or $6^{th}$ gears, transmission 18 may remain in or automatically shift to $5^{th}$ gear. It is contemplated that other "fail to" strategies may alternatively be incorporated, if desired.

INDUSTRIAL APPLICABILITY

The disclosed transmission may be applicable to any mobile application where travel functionality following an electrical power failure is desired. In particular, the disclosed transmission may include a backup latch system that provides reliable functionality during a power failure in a simple and inexpensive package. The operation of transmission 18 will now be explained.

Referring to FIG. 2, when transmission 18 is in operation, source 32 may pressurize fluid from tank 33 in preparation for a desired transmission gear engagement and direct the pressurized fluid through supply manifold 46 to control valves 34-42 via distribution lines 48-56. As a work machine operator selects a particular gear ratio or a gear ratio is otherwise automatically selected, a predetermined combination of one or more of control valves 34-42 may actuate to direct the pressurized fluid from supply manifold 46 into the actuation chambers of select clutches 22-30, thereby engaging one or more of clutches 22-30. The combination of engaged clutches 22-30 may determine the output ratio of transmission 18.

For example, to enter $1^{st}$ gear, a current may be applied to valve elements 72 of control valves 34 and 42 to move valve elements 72 from the flow bypassing position to the flow blocking position. When in the flow blocking position, the pressure within the associated pilot passageways 74 may increase and subsequently urge hydraulically actuated valve elements 70 leftward, with respect to FIG. 2, thereby connecting distribution lines 48 and 56 with clutches 22 and 30, respectively. As the pressurized fluid from distribution lines 48 and 50 fills clutches 22 and 30, the associated clutch packs may "touch up" to gears within transmission 18, thereby causing the desired gear engagement. To disengage the gears, the current may be removed from valve elements 72, thereby allowing the pressure within pilot passageways 74 to return the valve elements 72 to their original bypassing positions. In response to the bypassed flow of fluid, the pressure within pilot passageway 74 may reduce allowing valve elements 70 to return to their original positions at which clutches 22 and 30 are drained of fluid, resulting in disengagement of the gears.

In the event of electrical power failure, select clutches 22-26 may be retained in engagement or engage to ensure functionality of transmission 18. In particular, as the current flowing to master latch valve 78 stops (e.g., when the power failure occurs), the valve element of master latch valve 78 may be spring biased to the second position. When the valve element of master latch valve 78 is in the second position, fluid in communication with first end 80 of each latching valve element 76 may drain to tank 33. The higher pressure fluid of the actuated ones of clutches 22-26 may act on second end 84 of latching valve element 76 to urge latching valve element 76 against the spring bias toward the flow blocking position. When latching valve elements 76 are in the flow blocking position, the pressure of the fluid within pilot passageways 74 may remain high just as if valve elements 72 were in the flow blocking position. As a result, the ones of clutches 22-26 engaged prior to the power failure may remain engaged following the power failure.

Substantially simultaneously, the pressure of the fluid within the clutches 22 and 24 may be communicated with logic valve 79. That is, the fluid from clutch 22 may be communicated via communication line 86 with a first end of logic valve 79 opposite a second end communicated with fluid from clutch 24 via communication line 88. In response to the pressures within communication lines 86 and 88, three different actions may be observed. First, if the pressure of the fluid within communication line 86 is greater than the pressure of the fluid within communication line 88 (e.g., clutch 22 is engaged and clutch 24 is disengaged), the fluid from accumulator 92 may be directed to communication line 90, thereby engaging or retaining in engagement clutch 26. If the fluid within communication line 88 is at a greater pressure than the fluid within communication line 86 (e.g., clutch 24 is engaged and clutch 22 is disengaged), the fluid from accumulator 94 may be directed to communication line 90, thereby engaging or retaining in engagement clutch 26. However, if the pressure of the fluid within communication line 86 substantially matches the pressure of the fluid within communication line 88 (e.g., both of clutches 22 and 24 are disengaged), communication line 90 may be connected with tank 33 to drain clutch 26 of fluid. As a result of this hardware configuration and as illustrated in FIG. 3, any time one of clutches 22 or 24 is engaged subsequent to a power failure, clutch 26 may also be engaged.

Continuing with the example from above of transmission 18 being in 1st gear, upon power failure, master latch valve 78 may move to the second position. When in the second position, the first end 80 of the latching valve element 76 associated with control valve 34 may be communicated with tank 33 via communication line 82, thereby allowing latching valve element 76 to be urged leftward to block the flow of pressurized fluid from distribution line 48 through valve element 72 to tank 33 via drain line 60. As a result, the pressure within pilot passageway 74 may remain high enough or be filled to a high enough pressure via latching valve 76 to retain valve element 70 of control valve 34 in the clutch filling position. Substantially simultaneously, the pressure of the fluid from clutches 22 and 24 may be directed to logic valve 79 via communication lines 86 and 88. Because clutch 22 is currently engaged and clutch 24 disengaged, the pressure of the fluid within communication line 86 may be higher than the pressure of the fluid within communication line 88. As a result, logic valve 79 may be biased upward, relative to FIG. 2, thereby communicating the fluid from accumulator 92 with communication line 90. The high pressure fluid from accumulator 92 may then bias latching valve element 76 of control valve 38 leftward to prevent fluid from bypassing valve element 70, thereby pressurizing pilot passageway 74 and actuating clutch 26. In this example, upon power failure, transmission 18 shifted to or "failed to" 3rd gear.

Several advantages are associated with the hardware of transmission 18. Specifically, because transmission 18 provides a backup latch or "fail to gear" system within a minimal number of valve elements, transmission 18 may be simple and inexpensive. In addition, the minimal number of components may provide design flexibility and ease of packaging.

It will be apparent to those skilled in the art that various modifications and variations can be made to the transmission of the present disclosure. Other embodiments of the transmission will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A transmission, comprising:
    a source of pressurized fluid;
    a low pressure reservoir;
    a plurality of hydraulically actuated clutches;
    a first plurality of valve mechanisms, each of the first plurality of valve mechanisms associated with one of the plurality of hydraulically actuated clutches and configured to selectively fill and drain the associated one of the plurality of hydraulically actuated clutches;
    a second plurality of valve mechanisms, each of the second plurality of valve mechanisms associated with one of the plurality of hydraulically actuated clutches and configured to selectively fill and drain the associated one of the plurality of hydraulically actuated clutches, where the valve mechanisms in the first plurality of valve mechanisms are not in the second plurality of valve mechanisms; and
    a master latch mechanism in fluid communication with only the second plurality of valve mechanisms, the master latch mechanism configured to selectively affect movement of the second plurality of valve mechanisms in response to an electrical power failure.

2. The transmission of claim 1, wherein each of the first and second plurality of valve mechanisms includes:
    a first proportional valve element hydraulically movable between a first position at which the associated one of the plurality of hydraulically actuated clutches is filled with pressurized fluid, and a second position at which the associated one of the plurality of hydraulically actuated clutches is drained of fluid; and
    a second proportional valve element electrically movable between a first position at which pressurized fluid is directed to the low pressure reservoir, and a second position at which pressurized fluid is blocked from the low pressure reservoir,
    wherein the directing and blocking of pressurized fluid by the second proportional valve element facilitates movement of the first proportional valve element.

3. The transmission of claim 2, wherein each of only the second plurality of valve mechanisms also includes a latching shuttle valve disposed between the second proportional valve element and at least one of the source of pressurized fluid and the low pressure reservoir, each of the latching shuttle valves having a first end in fluid communication with the master latch mechanism, and a second end.

4. The transmission of claim 3, further including a logic valve in communication with the second ends of each of the latching shuffle valves.

5. The transmission of claim 4, wherein the second plurality of valve mechanisms includes a first valve mechanism, a second valve mechanism, and a third valve mechanism.

6. The transmission of claim 5, wherein the second end of the latching shuffle valves of only the first and second valve mechanisms is in fluid communication with the associated one of the hydraulically actuated clutches.

7. The transmission of claim 6, further including:
    a first accumulator associated with the first valve mechanism; and
    a second accumulator associated with the second valve mechanism.

8. The transmission of claim 7, wherein the second end of the latching shuffle valve of the third valve mechanism is in selective fluid communication with the first and second accumulators via the logic valve.

9. The transmission of claim 8, wherein:
    the second end of the latching shuffle valve of the first valve mechanism is in fluid communication with only the first accumulator; and
    the second end of the latching shuttle valve of the second valve mechanism is in fluid communication with only the second accumulator.

10. The transmission of claim 8, wherein the second end of the latching shuffle valve of the third valve mechanism is also in selective fluid communication with the low pressure reservoir via the logic valve.

11. The transmission of claim 1, wherein only the ones of the plurality of hydraulically actuated clutches associated with the second plurality of valve mechanisms are filled with pressurized fluid in response to electrical power failure.

12. A method of operating a transmission, comprising:
    pressurizing a fluid;
    selectively directing the pressurized fluid to and draining fluid from a first plurality of hydraulically actuated clutches via a first plurality of valve mechanisms;
    selectively directing the pressurized fluid to and draining fluid from a second plurality of hydraulically actuated clutches via a second plurality of valve mechanisms, where the valve mechanisms in the first plurality of valve mechanisms are not in the second plurality of valve mechanisms; and selectively affecting movement of only the second plurality of valve mechanisms in response to an electrical power failure.

13. The method of claim 12, wherein selectively affecting movement includes preventing pressurized fluid from draining from at least one of only the second plurality of valve mechanisms.

14. The method of claim 12, wherein selectively affecting movement includes:
   accumulating pressurized fluid with an accumulator associated with a first of the second plurality of valve mechanisms; and
   directing the accumulated fluid to a second of the second plurality of valve mechanisms.

15. The method of claim 14, wherein selectively affecting movement further includes:
   accumulating pressurized fluid with an accumulator associated with a third of the second plurality of valve mechanisms; and
   directing the accumulated fluid to the second of the second plurality of valve mechanisms.

16. The method of claim 15, wherein directing the accumulated fluid includes always directing the accumulated fluid to only the second of the second plurality of valve mechanisms.

17. A machine, comprising:
   a power source configured to generate a power output;
   a traction device configured to propel the machine; and
   a transmission configured to transmit the power output to the traction device, the transmission comprising:
      a source of pressurized fluid;
      a low pressure reservoir;
      a plurality of hydraulically actuated clutches;
      a first plurality of valve mechanisms, each of the first plurality of valve mechanisms associated with one of the plurality of hydraulically actuated clutches and configured to selectively fill and drain the associated one of the plurality of hydraulically actuated clutches;
      a second plurality of valve mechanisms, each of the second plurality of valve mechanisms associated with one of the plurality of hydraulically actuated clutches and configured to selectively fill and drain the associated one of the plurality of hydraulically actuated clutches where the valve mechanisms in the first plurality of valve mechanisms are not in the second plurality of valve mechanisms; and
      a master latch mechanism in fluid communication with only the second plurality of valve mechanisms, the master latch mechanism configured to selectively affect movement of the second plurality of valve mechanisms in response to an electrical power failure.

18. The machine of claim 17, wherein:
   each of the first and second plurality of valve mechanisms includes:
      a first proportional valve element hydraulically movable between a first position at which the associated one of the plurality of hydraulically actuated clutches is filled with pressurized fluid, and a second position at which the associated one of the plurality of hydraulically actuated clutches is drained of fluid; and
      a second proportional valve element electrically movable between a first position at which pressurized fluid is directed to the low pressure reservoir, and a second position at which pressurized fluid is blocked from the low pressure reservoir,
      wherein the directing and blocking of pressurized fluid by the second proportional valve element facilitates movement of the first proportional valve element;
      each of only the second plurality of valve mechanisms also includes a latching shuttle valve disposed between the second proportional valve element and at least one of the source of pressurized fluid and the low pressure reservoir; and
      each of the latching shuttle valves has a first end in fluid communication with the master latch mechanism, and a second end.

19. The machine of claim 18, wherein:
   the second plurality of valve mechanisms includes a first valve mechanism, a second valve mechanism, and a third valve mechanism; and
   the second end of the latching shuttle valves of only the first and second valve mechanisms is in fluid communication with the associated one of the hydraulically actuated clutches.

20. The machine of claim 19, wherein:
   the transmission further includes:
      a logic valve in communication with the second ends of each of the latching shuttle valves;
      a first accumulator associated with the first valve mechanism; and
      a second accumulator associated with the second valve mechanism; and
   the second end of the latching shuffle valve of the third valve mechanism is in selective fluid communication with the first accumulator, second accumulator, and the low pressure reservoir via the logic valve.

21. The machine of claim 20, wherein:
   the second end of the latching shuttle valve of the first valve mechanism is in fluid communication with only the first accumulator; and
   the second end of the latching shuffle valve of the second valve mechanism is in fluid communication with only the second accumulator.

22. The machine of claim 17, wherein only the ones of the plurality of hydraulically actuated clutches associated with the second plurality of valve mechanisms are filled with pressurized fluid in response to electrical power failure.

* * * * *